(12) United States Patent
Huddleston

(10) Patent No.: US 7,788,723 B2
(45) Date of Patent: Aug. 31, 2010

(54) METHOD AND APPARATUS FOR IDENTIFYING COMPUTER VULNERABILITIES USING EXPLOIT PROBES AND REMOTE SCANNING

(75) Inventor: David E. Huddleston, Lakewood, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1028 days.

(21) Appl. No.: 11/130,902

(22) Filed: May 17, 2005

(65) Prior Publication Data

US 2006/0265750 A1 Nov. 23, 2006

(51) Int. Cl.
*G06F 21/00* (2006.01)

(52) U.S. Cl. .............................. 726/24; 726/22; 726/23; 713/188; 713/189; 714/37

(58) Field of Classification Search .............. 726/22–24; 713/188–189, 200–201; 714/37
See application file for complete search history.

(56) References Cited

U.S. PATENT DOCUMENTS

| | | | | |
|---|---|---|---|---|
| 5,491,791 | A * | 2/1996 | Glowny et al. ................. | 714/37 |
| 5,812,763 | A | 9/1998 | Teng ...................... | 395/187.01 |
| 6,324,647 | B1 * | 11/2001 | Bowman-Amuah .......... | 726/23 |
| 6,530,024 | B1 * | 3/2003 | Proctor ........................ | 726/23 |
| 6,907,531 | B1 * | 6/2005 | Dodd et al. ................... | 726/25 |
| 6,954,858 | B1 * | 10/2005 | Welborn et al. ............... | 726/24 |
| 7,178,166 | B1 * | 2/2007 | Taylor et al. .................. | 726/25 |
| 2002/0099958 | A1 * | 7/2002 | Hrabik et al. ............... | 713/201 |
| 2002/0178383 | A1 | 11/2002 | Hrabik et al. ............... | 713/201 |
| 2002/0184532 | A1 * | 12/2002 | Hackenberger et al. ..... | 713/201 |
| 2003/0023866 | A1 * | 1/2003 | Hinchliffe et al. ........... | 713/200 |
| 2004/0015728 | A1 * | 1/2004 | Cole et al. ................... | 713/201 |
| 2004/0019803 | A1 * | 1/2004 | Jahn ........................... | 713/201 |
| 2004/0088581 | A1 * | 5/2004 | Brawn et al. ................ | 713/201 |
| 2005/0044418 | A1 * | 2/2005 | Miliefsky ................... | 713/201 |
| 2005/0086502 | A1 * | 4/2005 | Rayes et al. ................ | 713/189 |
| 2005/0091542 | A1 * | 4/2005 | Banzhof ..................... | 713/201 |
| 2005/0188215 | A1 * | 8/2005 | Shulman et al. ............ | 713/188 |

FOREIGN PATENT DOCUMENTS

WO  WO 02/03178 A2  1/2002

OTHER PUBLICATIONS

Garfinkel, S., Schwartz, A. and Spafford, G. "Practical UNIX and Internet Security." Published by O'Reilly, 2003. p. 684. ISPN 0596003234, 9780596003234.*
Smith, S. W. "WebALPS: A survey of e-commerce privacy and security applications." Published in ACM SIGecon Exchanges, vol. 2, Issue 3 (Summer 2001). p. 33.*
PCT International Search Report (PCT/US2006/019231) mailed Oct. 12, 2006 (11 pages).

* cited by examiner

*Primary Examiner*—Kieu Oanh Bui
*Assistant Examiner*—Kevin Richards
(74) *Attorney, Agent, or Firm*—Baker Botts L.L.P.

(57) ABSTRACT

Method and apparatus for providing computer security is provided. Subscriber information is stored in a repository and an exploit probe is sent to a subscriber's computer system. A probe message based on the computer system's response to the exploit probe is generated.

24 Claims, 3 Drawing Sheets

METHOD AND APPARATUS FOR IDENTIFYING COMPUTER VULNERABILITIES USING EXPLOIT PROBES AND REMOTE SCANNING

BACKGROUND

1. Technical Field

The present disclosure relates generally to security and, more particularly, to a method and apparatus for providing computer security.

2. Description of the Related Art

With the growth of the Internet, the increased use of computers and the exchange of information between individual users poses a threat to the security of computers. Computer security attempts to ensure the reliable operation of networking and computing resources and attempts to protect information on the computer or network from unauthorized corruption, access or disclosure. Computer system(s) as referred to herein may include(s) individual computers, servers, computing resources, applications, operating systems, networks, etc. Among the various security threats that present increasingly difficult challenges to the secure operation of computer systems are malicious software, such as computer viruses, worms, Trojan horses, etc. Such malicious software may be autonomous software agents that can cause mild to severe damage to computer systems by replicating and spreading themselves to a plurality of other computer systems.

Unwanted and/or unsolicited communications, for example emails, (collectively called SPAM) may present a similar challenge to computer systems and users. For the sake of understandability, the term "virus" is used herein as a general term and may include other forms of malicious software, such as worms and Trojan horses as well as other forms of undesirable transmissions, such as SPAM.

Computer viruses are programs that can infect other programs by modifying them in such a way as to include a copy of themselves. Unlike computer viruses, worms do not need to infect other programs. Worms are independent programs that are capable of reproducing themselves, spreading from machine to machine across network connections, often via email. A Trojan horse may be an executable program that appears to be desirable but is merely disguised as "friendly" and actually contains harmful code, allowing an attacker to come in through a "back door" and perform malicious actions on the computer system.

A software exploit may be characterized as a weakness or a "bug" in a computer system that makes the computer system highly vulnerable to malicious software attacks, such as computer viruses, worms, Trojan horses, etc. Malicious software is typically built upon software exploits and takes advantage of security flaws in computer systems. For example, a buffer overflow attack or buffer overrun bug may allow attackers to run arbitrary code on a computer system, such as, for example, a web server. These buffer overflow attacks may occur when a program attempts to write more data onto a buffer area in the web server than it can hold. This causes an overwriting of areas of stack memory in the web server and if performed correctly, allows malicious code to be placed on the web server which would then be executed.

Computer systems may utilize anti-virus programs in order to protect themselves from malicious software such as computer viruses, worms, Trojan horses, etc. One approach involves using anti-virus programs, such as virus scanning programs, to protect against the spread of viruses. Virus scanning programs may detect the virus and then isolate and remove the viral code. For example, the virus scanning program may contain a list of previously defined virus signatures, containing the binary patterns of a virus, each associated with a virus and scan the various files of a system looking for a match to a particular virus signature. If a virus is detected, the user may be notified and further steps may be taken to rid the system of the malicious code. However, virus scanning programs such as those mentioned above are time consuming and may not provide a computer system with comprehensive protection against malicious software attacks. For example, virus scanning software may detect viruses present in the system, but it may do nothing to prevent them from infiltrating the system in the first place. In other words, such an approach has no benefit until a virus is actually developed against a software exploit. By that time, the malicious software will have caused considerable damage to the computer system. In addition, the virus scanning software should be continuously updated in order to be effective in detecting new and modified malicious software attacks. This not only proves to be a very tedious and time consuming task for computer users, but also may not happen often enough to provide adequate safeguards against foreign intrusions.

Another anti-virus approach involves scanning a computer system in order to determine if the system may be vulnerable to software exploits. However, this approach is also time consuming and may not provide a computer system with comprehensive protection against malicious attacks. For example, the time required to scan all the computer systems in an organization may be long. Therefore, such a scanning strategy can monopolize and bog down an organization's computer systems, decreasing productivity. In addition, this approach may rely on a security service provider to generate signatures for computer systems which may be at risk from any given exploit. The combination of factors required to produce certain vulnerabilities may be complex. In the situation where multiple exploits have been released near the same point in time, a security service provider may have limited resources and will have to prioritize their responses to each exploit.

A more prevalent problem with software exploits is that the time between the release of a software exploit and the release of malicious software using the exploit is growing shorter. Some security experts find that "zero-day" exploits, code that takes advantage of previously unknown computer system vulnerabilities, are a growing threat. For example, the creator of the Slammer worm allowed network administrators six months to patch their systems before the worm was released in January 2003, the Sasser worm appeared in April 2004, three weeks after the associated software exploit was made public, and the Witty worm hit two days after a software exploit allowed it to spread.

Accordingly, it would be beneficial to provide a reliable, fast and efficient way to identify computer systems that contain vulnerable software exploits before a malicious software attack is launched.

SUMMARY

This present disclosure relates to a method and apparatus for providing computer security. A method for providing computer security, according to an embodiment of the present disclosure, includes storing subscriber information in a repository, sending an exploit probe to a subscriber's computer system, and generating a probe message based on the computer system's response to the exploit probe.

An apparatus for providing computer security, according to an embodiment of the present disclosure, includes a storing system for storing subscriber information in a repository, a sending system for sending an exploit probe to a subscriber's computer system, and a generating system for generating a probe message based on the computer system's response to the exploit probe.

A computer storage medium including computer executable code for providing computer security, according to an embodiment of the present disclosure, includes code for storing subscriber information in a repository, code for sending an exploit probe to a subscriber's computer system, and code for generating a probe message based on the computer system's response to the exploit probe.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for providing computer security. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
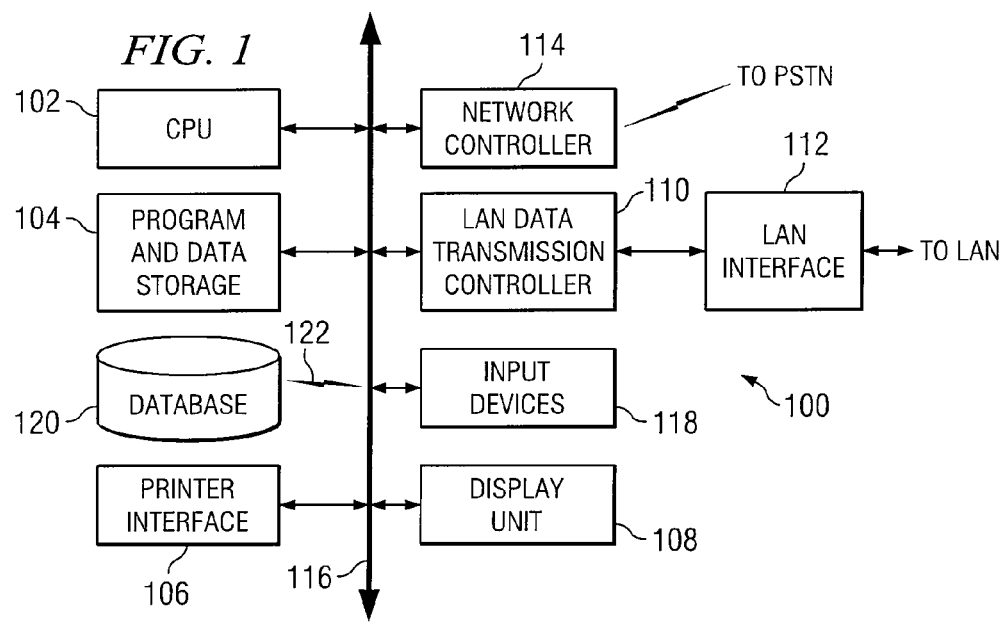
FIG. 1 shows a block diagram of an exemplary computer system capable of implementing the method and system of the present disclosure.

FIG. 1 shows an example of a computer system 100 which may implement the method and apparatus of the present disclosure. The apparatus and method of the present disclosure may be implemented in the form of a software application running on a computer system, for example, a mainframe, personal computer (PC), handheld computer, server, etc. The software application may be stored on a computer readable medium locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

Figure 2A:
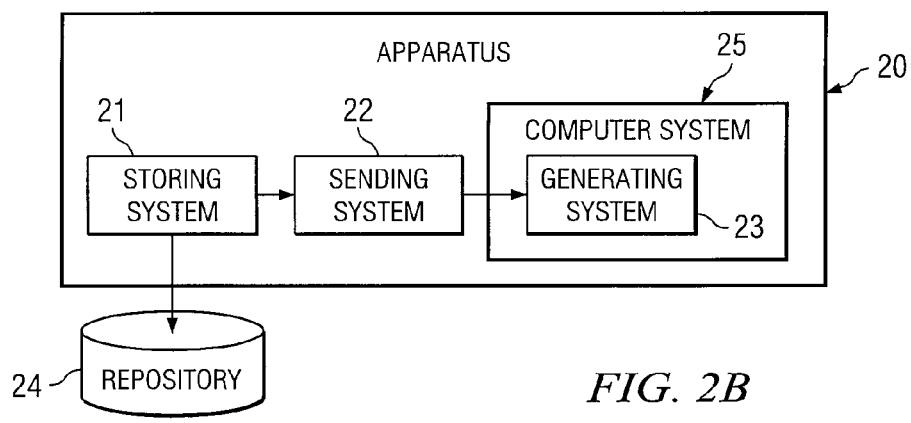
FIG. 2A shows a block diagram illustrating an apparatus for providing computer security, according an embodiment of the present disclosure.

An apparatus for providing computer security, according to one embodiment of the disclosure, will be discussed with reference to FIG. 2A. The apparatus 20 includes storing system 21, sending system 22, and generating system 23. The storing system 21 stores subscriber information in a repository 24. The subscriber information may include, for example, one or more internet protocol addresses associated with a subscriber. The sending system 22 sends an exploit probe to a subscriber's computer system 25. The exploit probe is a piece of software that exercises software exploits in a benign fashion, and may be capable of alerting a user to a vulnerability in the computer system 25. The exploit probe is generally designed to be general purpose and to have the smallest possible memory footprint possible to minimize any effects on the system memory when the probe is exercised. Versions of the exploit probe may be developed for various major software applications including, for example, Internet Explorer, Mozilla, Microsoft Office, etc., as well as various operating systems such as Windows, Linux, etc. Unlike a virus or other malicious code, the exploit probe is not self replicating and is thus not harmful to the computer system or network. The generating system 23 generates a probe message based on the computer system's 25 response to the exploit probe. It should be apparent that storing system 21, sending system 22 and generating system 23 can be respective portions of, or routines in, a computer program which provides computer security (and perhaps performs other functions).

Figure 2B:
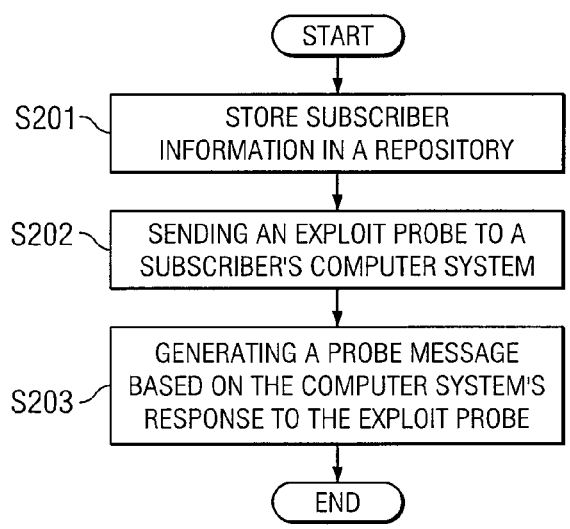
FIG. 2B shows a flow chart illustrating a method for providing computer security, according to an embodiment of the present disclosure.

A method for providing computer security, will be explained in more detail below with reference to FIGS. 2A and 2B. The storing system 21 stores subscriber information a repository (Step S201). The sending system 22 sends the exploit probe to a subscriber's computer system (Step S202). The generating system 23 generates a probe message based on the computer system's response to the exploit probe (Step S203).

As mentioned above, the software exploit probe may be used in a benign fashion to discover software exploits in a computer system, and may then alert users to possible computer system vulnerabilities. Use of the exploit probe may be faster than designing and deploying scanning instructions that may scan for the latest patches and defenses. The exploit probe may deploy a small payload with a very low likelihood of disruption. Unlike a virus or other malicious software attack, the exploit probe will not replicate itself on a computer system and therefore has very small likelihood of causing disturbances on that computer system. The exploit probe may consist of generic software code that may operate in conjunction with all software applications and/or operating systems. According to another embodiment, different versions of the exploit probe code may be designed and utilized for each software application and/or operating system.

According to one embodiment of the present disclosure, the exploit probe may operate alone to alert a user to a vulnerability by using, for example, a dialog box, email, vulnerability report, directions for implementing remedial measures, for example, installing a patch and/or a logged message. The exploit probe may also/alternatively automatically take corrective action. For example, it may generate a trouble ticket, block one or more ports, push and/or pull patches and/or log off a network. According to another embodiment of the present disclosure, the exploit probe may work in conjunction with a local system service in order to provide users with a detailed response of possible computer system vulnerabilities. According to this embodiment, the exploit code may reside in minimal memory space. Upon receiving a probe message based on the exploit probe, the local system service may execute a wide variety of actions. For example, if the probe message is related to the Microsoft® Windows® operating system, a single function in a Windows® system library may broadcast a Windows® message relating to the possible vulnerability. The local system service may listen for the Windows® message and handle it. By working in this way, minimal memory may be allocated by the function call from the probe message to dynamically link to the library function.

Different actions may be taken to warn one or more users of computer system vulnerabilities. According to one embodiment, the local system service only warns a local user of the exploit vulnerability. According to another embodiment, the local system service may provide distributed alerts and log messages across for example, a computer network. According to another embodiment, the computer system vulnerability may simply be logged locally or centrally for future use.

Embodiments of the present disclosure may be implemented as a stand-alone device and/or application and/or may be integrated with an existing security monitoring device and/or application. For example, embodiments of the present disclosure may be integrated with eTrust® services offered by Computer Associates®. For example, system vulnerability reports may be correlated with asset management utilities, for example, Unicenter® asset management offered by Computer Associates®. System vulnerability reports, for example, may gauge the risk of exploitation and/or prioritize remedial responses. For example, embodiments of the present disclosure may be integrated with security tools, for example firewalls.

Embodiments of the present disclosure may be remotely deployed to targeted systems and/or may be user initiated. For example, a user may invite an exploit probe manually or automatically, for example at startup and/or as part of a logon script.

Where embodiments of the present disclosure may cause disturbances, for example, an addition in an event log, a Dr. Watsons alert, etc., steps may be taken to mitigate possible disturbances. For example, a user may be warned and/or event logs and alerts modified and/or suppressed.

Figure 3:
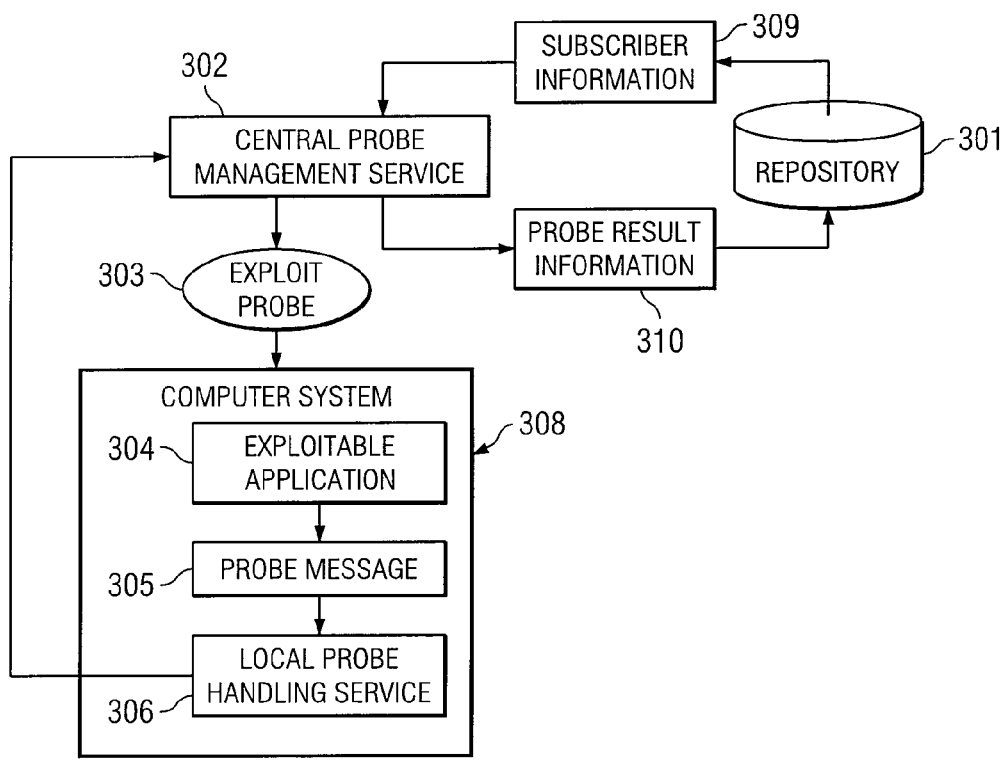
FIG. 3 shows a block diagram illustrating an apparatus for providing computer security, according to an embodiment of the present disclosure.

FIG. 3 is a block diagram illustrating an apparatus for providing computer security according to an embodiment of the present disclosure. A central probe management service 302, such as a server, manages the deployment of an exploit probe 303 to, for example, subscribers to an exploit probe service. The exploit probe may be a component in a self-healing system or part of a framework that attempts to discover zero-day exploits. The subscriber information 309 may be stored in a repository, such as a centralized database 301. For example, the central probe management service 302 may be a server that is programmed to automatically send exploit probes 303 at predetermined intervals or may be manually manipulated to send exploit probes 303 when desired. In addition, the central probe management service 302 may send the exploit probes 303 to specified destinations. For example, probing may be limited to the Internet Protocol (IP) addresses of subscribers to the central probe management service 302, or may be limited to computer systems available within an enterprise's Intranet, whereby an exploit probe 303 may be deployed as one of the steps in a network login. The exploit probe 303 may be deployed to one or more exploitable applications 304 within one or more computer systems 308 in order to determine whether computer system vulnerabilities exist. A probe message 305 may be sent to a local probe handling service 306. Based on the probe message 305, the local probe handling service 306 may then transmit information (such as statistics, diagnostic information, etc.) to the central probe management service 302. For example, a null result transmitted by the local probe handling service 306 may indicate that computer system 308 is not vulnerable to attack. According to an embodiment of the present disclosure, probe messages 305 may employ security signatures and/or encryption in order to forestall spoofing or corrupting of the local probe handling service 306.

Figure 4:
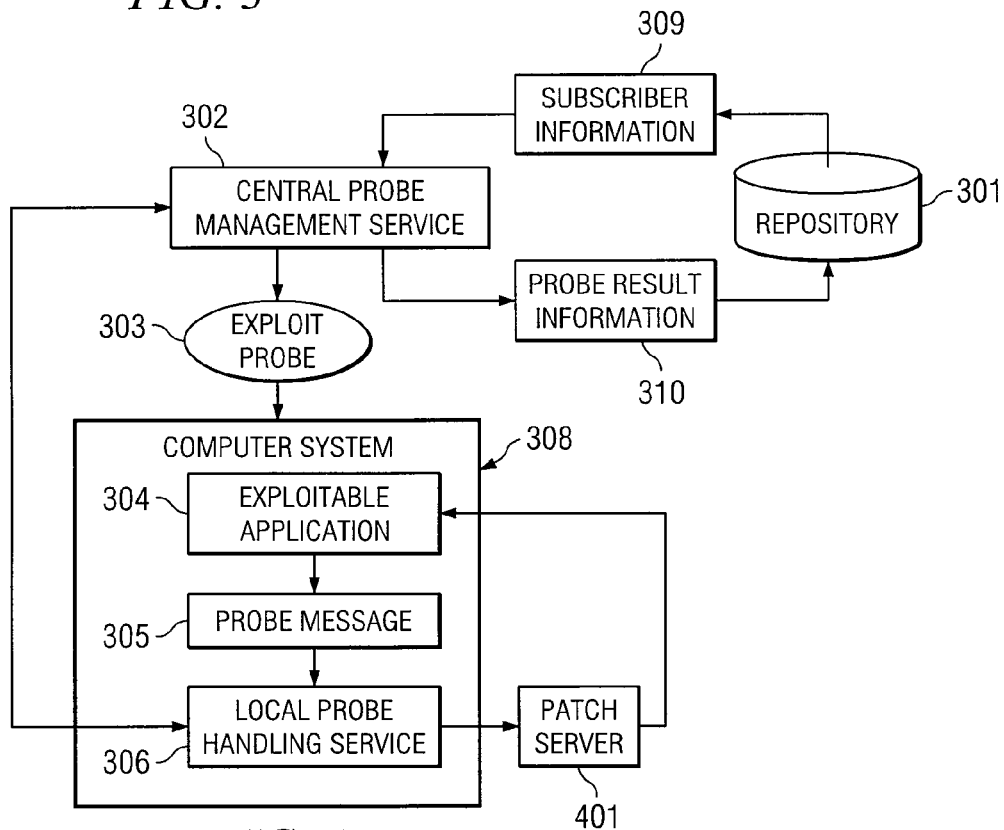
FIG. 4 shows a block diagram illustrating an apparatus for providing computer security in connection with a self-healing system, according to an embodiment of the present disclosure.

FIG. 4 is a block diagram illustrating an apparatus for providing computer security in connection with a self-healing system, according to an embodiment of the present disclosure. In this embodiment, the local probe handling service 306 may remedy computer system 308 vulnerabilities. For example, the local probe handling service 306 may load a patch from a patch server 401 and automatically deploy it to the exploitable application 304. The local probe handling service 306 may look up details of a specific exploit by transmitting information (such as statistics, diagnostic information, patch information, etc.) to the central probe management service 302. The central probe management service 302 may use the probe result information 310 to query the repository 301 for exploit details. According to another embodiment of the present disclosure, the local probe handling service 306 may lock down one or more ports when a probe message 305 indicates that a firewall is unavailable or ineffective.

Figure 5:
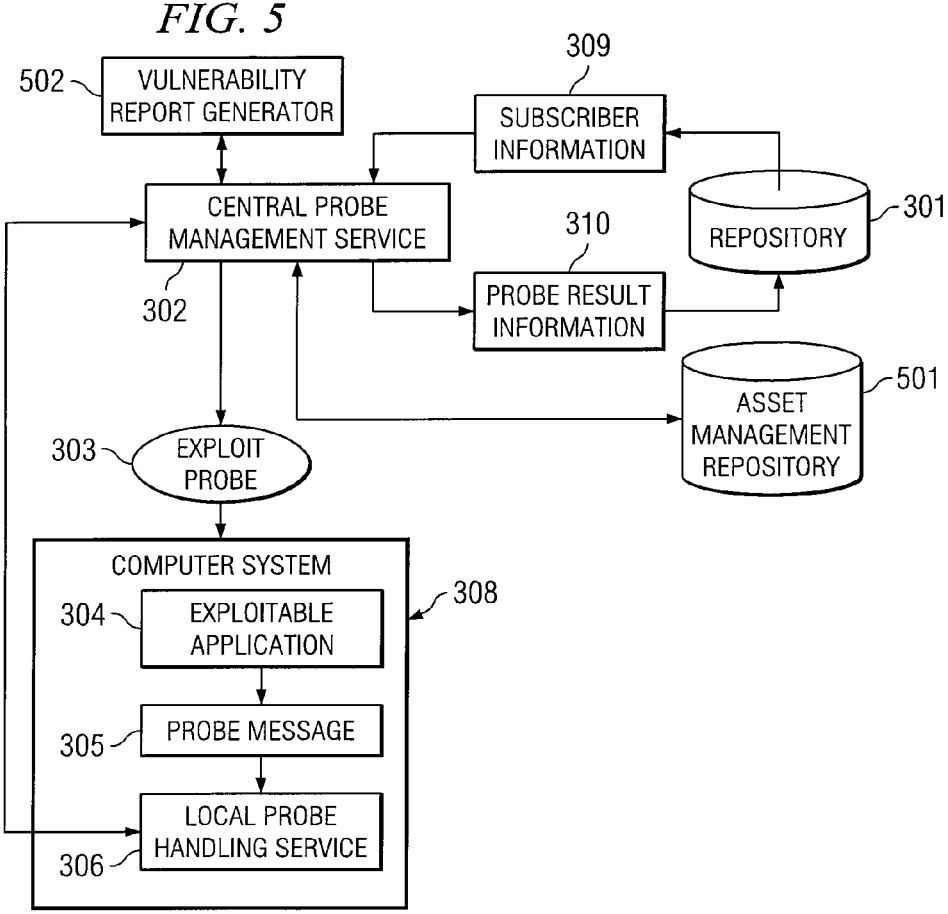
FIG. 5 shows a block diagram illustrating an apparatus for providing computer security in connection with an asset management system, according to an embodiment of the present disclosure.

FIG. 5 is a block diagram illustrating an apparatus for providing computer security in connection with an asset management system, according to an embodiment of the present disclosure. In this embodiment, the local probe handling service 306 can communicate with the central probe management service 302 in order to register that the computer system 308 is at risk from a discovered exploit. The central probe management service 302 may then obtain vulnerability reports from a vulnerability report generator 502 and provide them to the asset management repository 501. The vulnerability report 502 allows users to correlate the exploit vulnerabilities and the computer system characteristics that the exploits may target. The local probe handling service 306 may solicit exploit probes 303 from the central probe management service 302 at different intervals, such as, boot time. Probing at boot time may result in less of a risk of a memory overrun from an exploit probe 303. The local probe handling service 306 may set flags indicating the successful reception of an exploit probe 303 along with other handshaking information, which may allow the central probe management service 302 to determine when an exploit probe 303 results in a system disturbance. This embodiment may be important to users because once a new exploit is released, the antivirus community must prioritize the work of developing a scan package for types and versions of software that may be at risk for the exploit. In addition, it could also be used to prioritize the risk from a newly released virus for an exploit, and thus allow the antivirus community to formulate a more informed response to the outbreak.

According to another embodiment of the present disclosure, the exploit probe may be deployed to a computer system which, for example, initiates virus drills. Virus drills may simulate computer virus attacks by providing subscribers with tempting bait, for example interesting email subject lines or attachments. This embodiment might be most useful for highly secure installations, such as government installations, where it may be desirable to gauge the vulnerabilities of the user population, in addition to that of computer systems. For example, a simple email virus may use a sophisticated message to fool users into executing a malicious script attachment. A release of emails with such sophisticated messaging, but which have exploit probe attachments rather than malicious attachments, may provide an assessment of a given user community's vulnerability. In addition, exploit probe attachments may help educate the user community on self-defense against malicious software attacks.

Embodiments of the present disclosure may be used to combat sophisticated techniques such as, for example, "human engineering" used by viruses to trick users into allowing infection. Additionally, embodiments of the present disclosure may be used to gauge user community readiness, for example, to ascertain susceptibility and perform risk management analysis.

Figure 6:
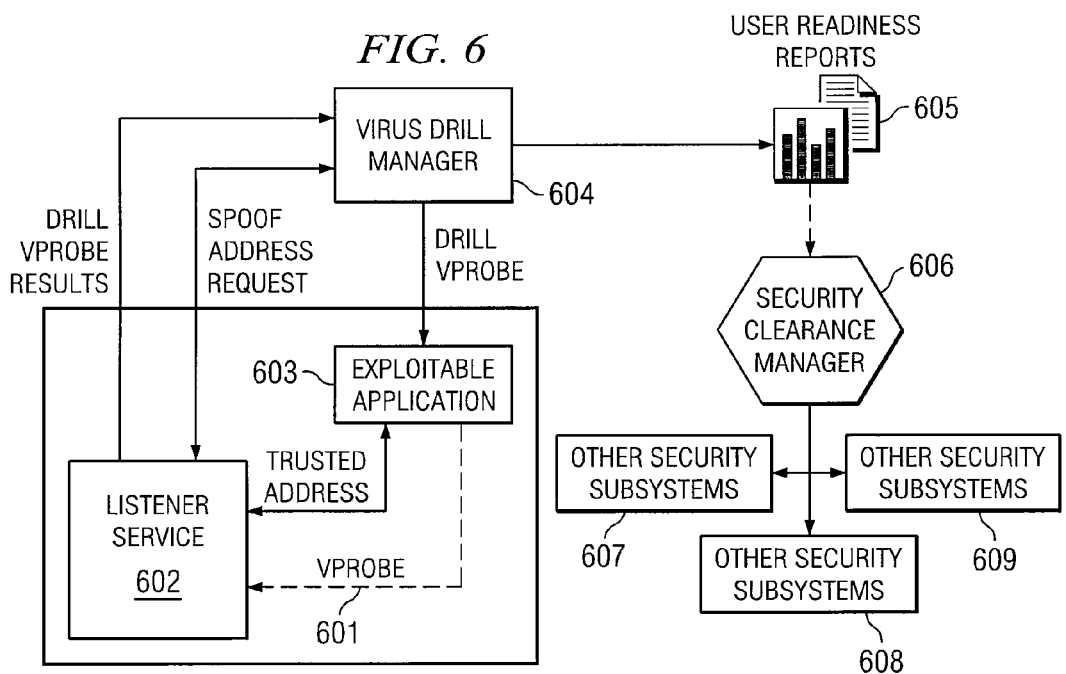
FIG. 6 shows a block diagram illustrating an apparatus for providing computer security, according to another embodiment of the present disclosure.

Another embodiment of the present disclosure is a variation of the above embodiments for testing vulnerabilities of a user community. This embodiment provides a system to manage "Virus Security Clearances" for a community or communities of users. The present embodiment is illustrated in FIG. 6, whereby virus drills can be conducted within a user community utilizing a virus drill manager 604. Virus drill manager 604 issues virus drill probes to one or more computer systems 601. The virus drill probes may be deployed to one or more exploitable applications 603 within one or more computer systems 601 in order to determine whether computer system vulnerabilities exist. A virus probe message 305 may be sent to listener service 602. Based on the virus probe message, listener service 602 then sends virus drill probe results to virus drill manager 604. Virus drill manager 604 may then send information such as user readiness reports 605 to a security clearance manager 606. Based upon a user's performance during the drill(s) a security clearance can be assigned or updated for the user by security clearance manager 606. Security clearance manager 606 can make security clearances available to other security sub-systems 607-609, either local or distributed, to filter access rights of users to enterprise resources. The cooperating service on the computer system being tested could further drill users by obtaining "trusted addresses" (e.g., URLs or email addresses) from sub-systems on the system being tested, and transmitting these to the virus drill manager 604 in response to a spoof address request from the virus drill manager 604. The "trusted addresses" may then be utilized by the virus drill manager 604 for spoofing when deploying the exploit/drill probe.

The apparatus for providing computer security may be employed in a framework which may search for zero-day exploits, according to an embodiment of the present disclosure. It is likely that previously unknown exploits may be discovered by sending general purpose probes within large and diverse environments, such as, a company Intranet.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for providing computer security, comprising:
storing subscriber information in a repository;
sending an exploit probe to a subscriber's computer system, the exploit probe comprising a general purpose probe for discovering one or more zero-day exploits that is a previously unknown vulnerability, the general purpose probe comprising a generic piece of software of a single version that operates on a plurality of software applications offered by a plurality of vendors to exploit at least one zero-day exploit that is a previously unknown vulnerability in a benign fashion;
generating a probe message based on a response from the subscriber's computer system to the exploit probe; and
identifying at least one zero-day exploit that is a previously unknown vulnerability based on a response from the subscriber's computer system to the exploit probe,
using the exploit probe to generate a virus drill on the subscriber's computer system, the virus drill simulating a plurality of computer virus attacks; and
assessing the vulnerabilities of the subscriber's computer system and a user associated with the subscriber's computer system based on a performance of the user during the virus drill that simulates the plurality of attacks.

2. The method of claim 1, wherein the repository is a database.

3. The method of claim 1, wherein the subscriber information comprises one or more internet protocol addresses.

4. The method of claim 1, wherein the exploit probe is sent to the subscriber's computer system manually or automatically.

5. The method of claim 1, further comprising alerting a user to a computer system exploit.

6. The method of claim 5, wherein the alert is generated based on the probe message.

7. The method of claim 5, wherein the alert comprises at least one of a sound generating element and a text message.

8. The method of claim 1, wherein the computer system deploys a patch to fix a computer system exploit.

9. The method of claim 1, wherein exploit information is stored in the repository.

10. The method of claim 1, further comprising storing asset management information; generating an exploit vulnerability report and comparing the exploit vulnerability report with the asset management information.

11. The method of claim 1, wherein the exploit probe is sent to the subscriber's computer system a during the performance of one or more steps performed during the execution of a logon script during a network login by the subscriber.

12. The method of claim 1, further comprising:
transmitting a spoof address request from a virus drill manager to the subscriber's computer system;
receiving a plurality of trusted addresses from the subscriber's computer system;
transmitting a virus drill to each of the plurality of trusted addresses, each virus drill simulating a plurality of computer virus attacks.

13. A computer readable storage medium including computer executable code for providing computer security, comprising:
- code for storing subscriber information in a repository;
- code for sending an exploit probe to a subscriber's computer system, the exploit probe comprising a general purpose probe for discovering one or more zero-day exploits that is a previously unknown vulnerability, the general purpose probe comprising a generic piece of software of a single version that operates on a plurality of software applications offered by a plurality of vendors to exploit at least one zero-day exploit that is a previously unknown vulnerability in a benign fashion;
- code for generating a probe message based on a response from the subscriber's computer system to the exploit probe; and
- code for identifying at least one zero-day exploit that is a previously unknown vulnerability based on a response from the subscriber's computer system to the exploit probe,
- code for using the exploit probe to generate a virus drill on the subscriber's computer system, the virus drill simulating a plurality of computer virus attack; and
- code for assessing the vulnerabilities of the subscriber's computer system and a user associated with the subscriber's computer system based on a performance of the user during the virus drill that simulates the plurality of attacks.

14. The computer readable storage medium of claim 13, wherein the repository is a database.

15. The computer readable storage medium of claim 13, wherein the subscriber information comprises one or more internet protocol addresses.

16. The computer readable storage medium of claim 13, wherein the exploit probe is sent to the subscriber's computer system manually or automatically.

17. The computer readable storage medium of claim 13, further comprising code for alerting a user to a computer system exploit.

18. The computer readable storage medium of claim 17, wherein the alert is generated based on the probe message.

19. The computer readable storage medium of claim 17, wherein the alert comprises at least one of a sound generating element and a text message.

20. The computer readable storage medium of claim 17, wherein the computer system deploys a patch to fix a computer system exploit.

21. The computer readable storage medium of claim 13, wherein exploit information is stored in the repository.

22. The computer readable storage medium of claim 13, further comprising code for storing asset management information; code for generating a exploit vulnerability report and code for comparing the exploit vulnerability report with the asset management information.

23. The computer readable storage medium of claim 13, wherein the exploit probe is sent to the subscriber's computer system a during the performance of one or more steps performed during the execution of a logon script during a network login by the subscriber.

24. The computer readable storage medium of claim 13, further comprising:
- code for transmitting a spoof address request from a virus drill manager to the subscriber's computer system;
- code for receiving a plurality of trusted addresses from the subscriber's computer system;
- code for transmitting a virus drill to each of the plurality of trusted addresses, each virus drill simulating a plurality of computer virus attacks.

* * * * *